Sept. 28, 1926. 1,600,988
A. F. MASURY
VEHICLE CONSTRUCTION
Filed May 31, 1924
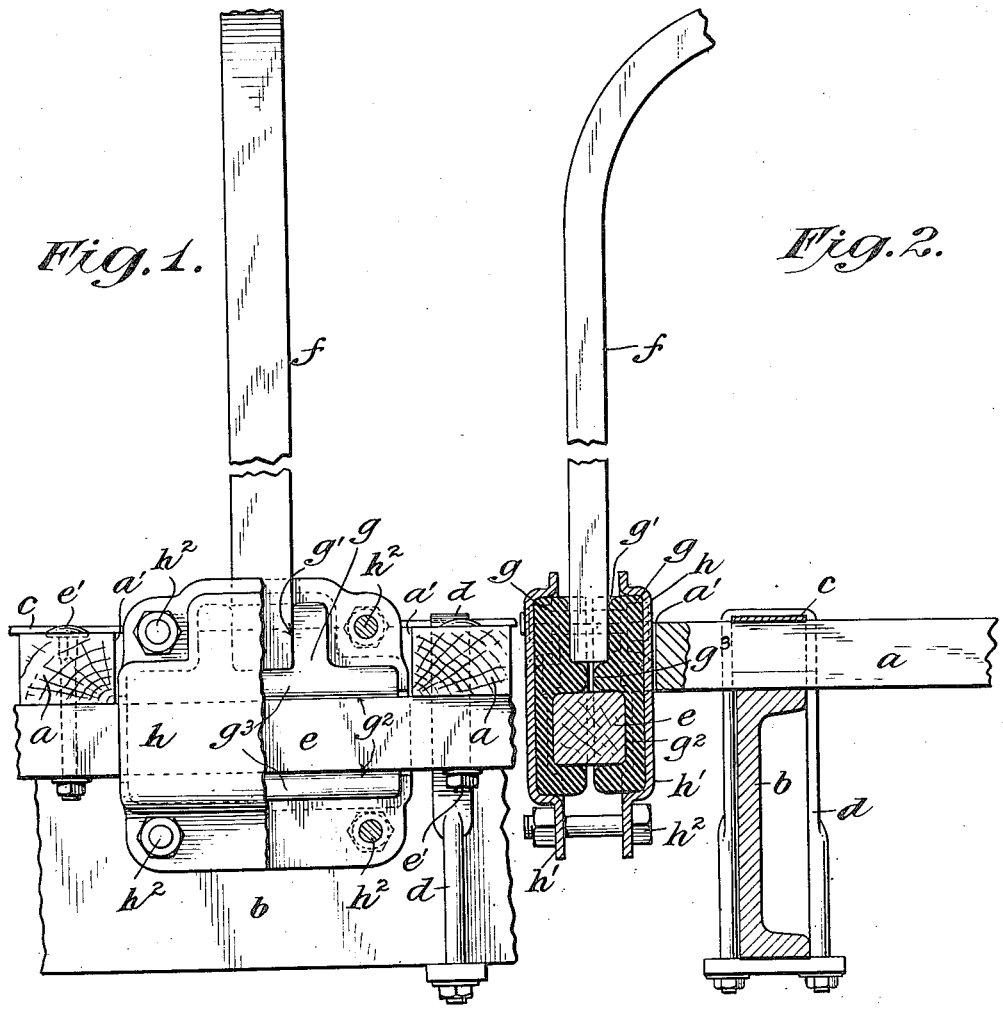

Patented Sept. 28, 1926.

1,600,988

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

VEHICLE CONSTRUCTION.

Application filed May 31, 1924. Serial No. 716,929.

This invention relates to vehicles and more particularly to connections between various elements in the bodies thereof. It is an object of the invention to provide connections which will permit relative movement within prescribed limits between elements of a vehicle body whereby movement of one such element will not subject the connection to destructive strains. Another object of the invention is to provide a connection which shall be noiseless during the relative movement of the respective elements. Still another object of the invention is to provide a connection between the vehicle top and the floor whereby weaving of the chassis frame is permitted without subjecting the top and the connections between the top and floor to undue stresses and strains. In accordance with the invention yielding non-metallic material is provided in the connection and is adapted to engage the respective elements to be connected, means being provided to retain the yielding non-metallic material in clamping engagement with the respective elements. In order that the invention may be clearly understood and readily carried into effect a preferred embodiment thereof will now be described in connection with the accompanying drawings wherein:

Figure 1 is a view in side elevation showing so much of the chassis frame, vehicle floor and an element of the top as is necessary to illustrate the application of the invention thereto.

Figure 2 is a view in transverse section, looking from the right in Figure 1, showing the yielding non-metallic connection between a carline and sill of a motor vehicle.

While the invention has been illustrated and will be described as applied to a connection between the sill and carline of a motor vehicle body it will be understood that it is equally applicable in any situation in which respective elements of a vehicle are to be connected with provision for relative movement therebetween and having as one of its objects the provision of a semi-flexible structure. In the drawings transversely disposed floor boards $a$ are shown as resting directly upon the channel $b$ forming one of the longitudinal side members of the chassis frame and rigidly secured thereto through the provision of the metal strip $c$ disposed along the top of the boards in the vertical plane of the channel and serving to clamp the boards rigidly against the top face of the channel by means of the U bolts $d$. Such a construction has heretofore been known and results in a floor for the vehicle which follows every movement of the chassis frame when weaving in passing over inequalities in the road bed. In order to provide a construction in which the top will not be subjected to strains and stresses upon weaving of the chassis the connection according to the present invention is proposed between the top and the floor. To this end a sill $e$ is secured, as by bolts $e'$, to the lower side of the floor boards $a$ at the ends thereof along either side of the vehicle. At predetermined intervals along each side of the vehicle the floor is recessed as at $a'$ for the reception of the connection according to the present invention. These recesses will preferably be formed at the points where the carlines are to be secured to the floor. Such a carline is indicated at $f$ and is shown as extending downwardly into the recess $a'$ and terminating slightly above the sill $e$. Blocks of yielding non-metallic material such as rubber are indicated at $g, g$ and are recessed as at $g'$ for the reception of the end of the carlines $f$ and at $g^2$ for the reception of the sill $e$. These blocks are disposed inwardly and outwardly, respectively, of the carlines and sill as clearly shown in Figure 2 and are adapted to be retained in engagement with the sill and carline by means of a housing indicated in general at $h$ and formed preferably of two symmetrical steel stampings $h'$, $h'$ adapted to be retained by the bolts $h^2$ in position to clamp the yielding non-metallic material against the sill and end of the carline to maintain them in predetermined position with provision for relative movement therebetween. By taking up on the bolts $h^2$ the material $g$ may be maintained under compression whereby the resiliency, strength and wearing qualities thereof are increased. Only a single connection upon one side of the vehicle has been illustrated but it will be understood that any desired number of such connections may be used upon both sides of the vehicle or at the ends thereof.

It will be observed that portions $g^3$ of the rubber extend between the end of the carline and the sill so that the wood of the respective parts does not touch and therefore cannot become worn and so loosened and no squeaks or other objectionable noises can arise during operation of the vehicle. Since the sill is rigidly connected with the floor and the floor weaves with the chassis frame the yielding non-metallic material provides a connection which will permit such movement without impressing deleterious strains and stresses upon the frame of the top.

The invention is not to be considered limited to the particular application thereof illustrated in the drawings nor to the form nor disposition of the respective parts since many applications thereof about a motor vehicle will occur to those skilled in the art and obvious changes therein may be made in different situations.

What I claim is:

1. In combination, chassis side frame members of a motor vehicle and transverse floor boards, longitudinal strips disposed above the floor boards in the vertical plane of the side frame members, U bolts rigidly connecting the strips, floor boards and side frame members respectively, sills secured below the outer ends of the floor boards at the sides of the vehicle, the floor boards being formed at their outer edges at predetermined intervals with recesses, carlines disposed above the floor boards at predetermined intervals and entering the recesses respectively, blocks of yielding non-metallic material engaging both the sill and the carline respectively and disposed within the recesses, and housing adapted to maintain the blocks in clamping engagement with the sills and carlines.

2. In combination, chassis side frame members of a motor vehicle and a floor, means to secure the floor to the side frame members, sills secured below the floor at the sides of the vehicle, the floor being formed at its outer edge at predetermined intervals with recesses, carlines disposed above the floor at predetermined intervals and entering the recesses, respectively, blocks of yielding non-metallic material engaging both the sill and carline, respectively and disposed within the recesses and housings adapted to maintain the blocks in clamping engagement with the sills and carlines.

This specification signed this 23 day of May A. D. 1924.

ALFRED F. MASURY.